July 17, 1928.

F. FRANK 1,677,757

TREATMENT OF CARBONACEOUS AND OTHER MATERIALS

Filed Dec. 1, 1920      5 Sheets-Sheet 3

Fig. 2A

WITNESSES

INVENTOR.
Felix Frank
BY
ATTORNEYS.

July 17, 1928.  1,677,757
F. FRANK
TREATMENT OF CARBONACEOUS AND OTHER MATERIALS
Filed Dec. 1, 1920  5 Sheets-Sheet 4

WITNESSES
INVENTOR
Felix Frank
BY
ATTORNEYS

Patented July 17, 1928.

UNITED STATES PATENT OFFICE.

FELIX FRANK, OF SAN FRANCISCO, CALIFORNIA, ASSIGNOR, BY MESNE ASSIGNMENTS, TO WILLIAM WALLACE KEMP, OF BALTIMORE, MARYLAND.

TREATMENT OF CARBONACEOUS AND OTHER MATERIALS.

Application filed December 1, 1920. Serial No. 427,566.

The object of the invention is to provide certain new and useful improvements in the treatment of carbonaceous and other materials with a view, first, to manufacture coke from coal and utilizing and recovering all by-products; second, to carry on a dry destructive distillation of peat, lignite, shale, browncoal, coal in general, materials of vegetable origin or structure such as sawdust, wood, roots, leaves and the like; third, to produce water gas, producer gas and the like by completely gasifying the carbon content in coke or coal and particularly that content in the carbonized residues obtained in carrying out the process; fourth, to manufacture gas for illuminating and heating purposes from mineral oils like crude petroleum; fifth, to manufacture lighter hydrocarbons from high-boiling asphaltic residues incident in the refining of petroleum without or with high temperatures or pressures; sixth, to manufacture animal charcoal, bone oil, ammonia, etc., from bones.

Another object is to provide a continuous treatment of the particular material and to utilize a portion of the resultant fuel gas for carrying on the process, at the same time permitting the treatment of large quantities of the material in a comparatively short time thus rendering the process exceedingly economical both as to the cost of labor and fuel.

One of the principal objects of my invention is the use not only of the recognized physico-chemical properties of a flame, such as size, shape, calorific intensity, heat concentration and flame propagation, but also to subject the material to be treated to molecular or ionical wave movement, vibration or bombardment taking place or originating in the flame zone. It is my theory that the molecules and ions of the burning substances which form the flame revolve and circulate with such enormously high velocity that when the material to be treated is interposed as an obstacle in their path it is subjected to and undergoes a violent bombardment of molecules and ions and the attendant severe friction between the molecules and ions of the flame components and those of the material to be treated probably imparts certain vibrations to the latter which serve to accelerate the chemical reactions to be achieved by the process. I also maintain that there are molecules and ions of the flame components which move about within the flame or radiate therefrom in form of innumerable waves the length of which lies between and beyond that of the infra-red and the ultraviolet. I believe that when the material to be treated is placed in the path of these waves it acts as a breaker and that it is penetrated partly or wholly by these waves and that a molecular or ionical movement or vibration is thereupon set up within the material to be treated which facilitates, accelerates or makes possible the desired reactions.

As the material to be treated is being subjected to the direct action of the flame which may be luminous or non-luminous, visible or invisible, the material in or near the flame is probably first raised to approximately flame temperature at which temperature the material may be incandescent or glowing. Then the next nearest strata or layer of material is being raised to the temperature of the flame and I have observed that the flame zone is being widened, deepened or enlarged in the measure as the volume of material is heated to approximately flame temperature. When the material to be treated has been heated to a high temperature the combustible mixture of materials including oxygen which issues from the burner on which the flame originally is produced will in whole or in part not only burn on the burner orifice but may also burn within the voids throughout the entire mass of the material under treatment. This may be partly explained by the enormous expansion in the volume of the combustible mixture of materials including oxygen on issuing from the burner orifice onto the material to be treated. The increase in volume brings about an increase in the velocity of the combustible mixture of materials including oxygen which is then driven or forced into the voids of, in and between the material to be treated until its velocity has again reached a point where the rate of flame propagation is about equal to the velocity of the combustible mixture of materials including oxygen and the combustible mixture will then burn at about the point where this condition has been reached. Thus a live flame may be located during the process not only at the burner orifice, but at any other point in, between or under the material to be treated and in direct intimate contact therewith. But whether or not the above stated hypothesis be correct it is certain that the chemical changes occurring in the flame itself are very vigorous and forceful and it is an object of my invention to submit the material to be treated to the full intensity of the flame-reactions and flame-conditions, whatever their character or nature and to attain this object they are brought into direct intimate contact with the live flame itself.

In order to produce the desired result, use is made of a process which consists essentially in subjecting the material, under the exclusion of atmospheric air, to the direct action of a flame preferably produced by burning a combustible mixture of fuel gas and air in a predetermined ratio to heat the material and thereby separate the volatile matter from the material without igniting or burning such volatile matter or the residues.

To treat the different materials above referred to by the process mentioned use has necessarily to be made of different apparatus such, for instance, as shown in the accompanying drawings, in which similar characters of reference indicate corresponding parts in all the views.

Figure 2ª is a longitudinal section of the catalytic converter box;

Figure 5 is a longitudinal central section of another modified form of the apparatus.

Figure 1:
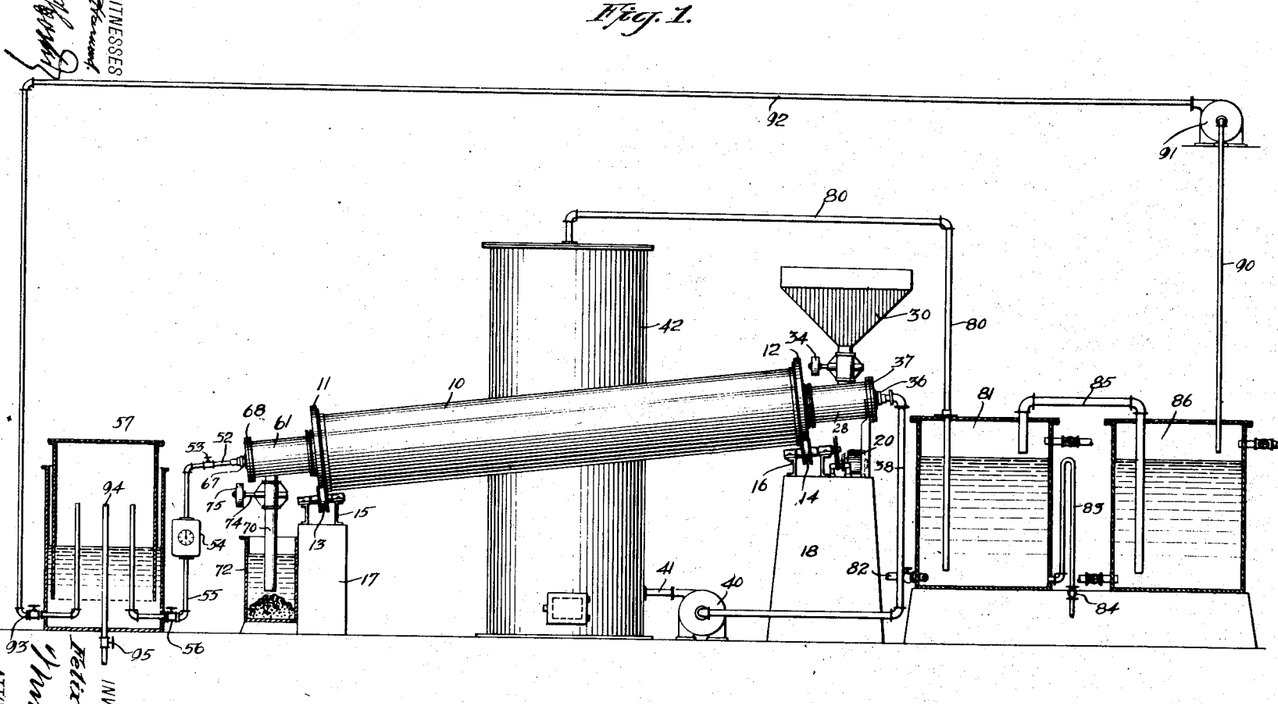
Figure 1 is a side elevation, with parts in section, of an apparatus particularly effective for the distillation of lignite, brown-coal and similar carbonaceous materials.
Figure 2:
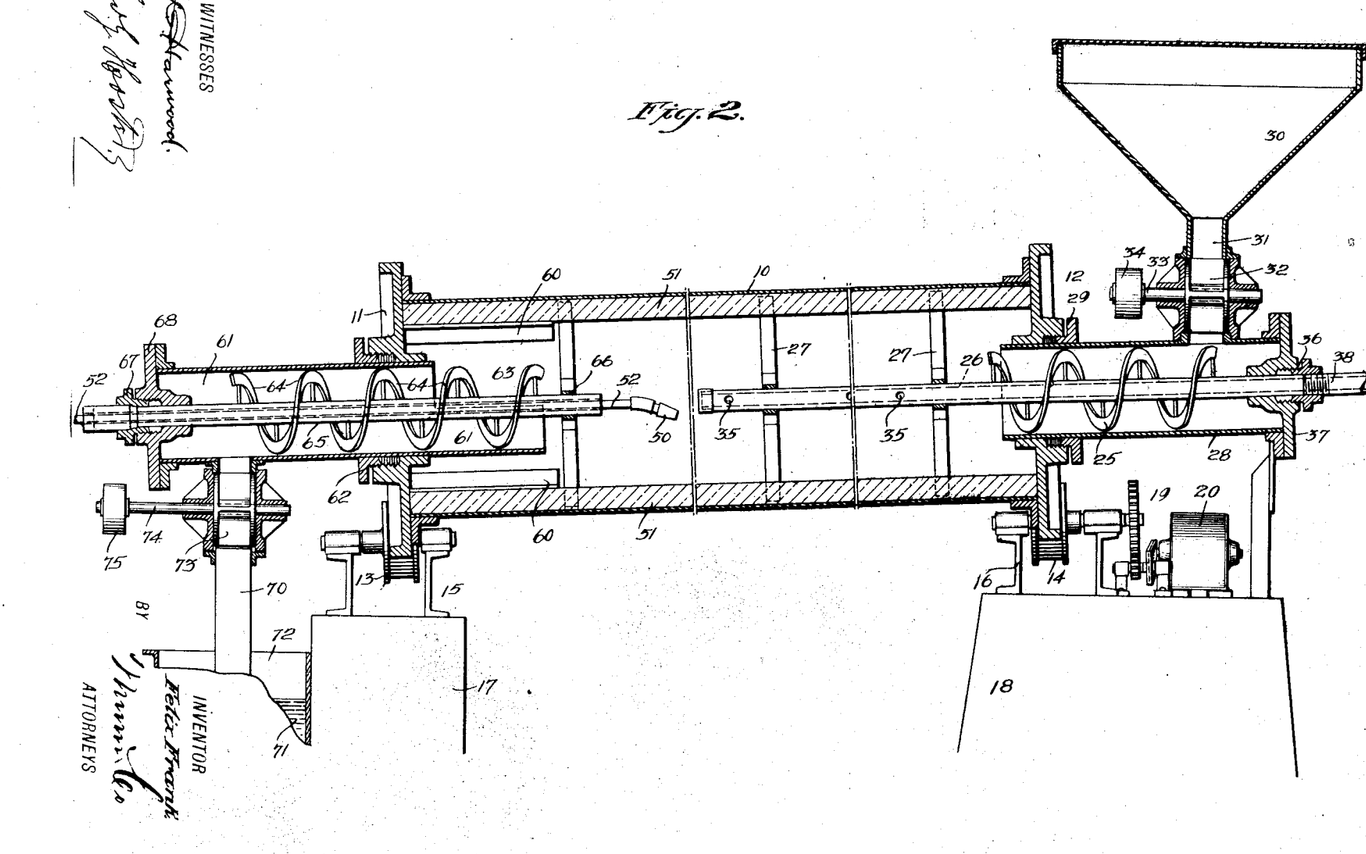
Figure 2 is an enlarged longitudinal central section of the retort of the apparatus shown in Figure 1.
Figure 2A:
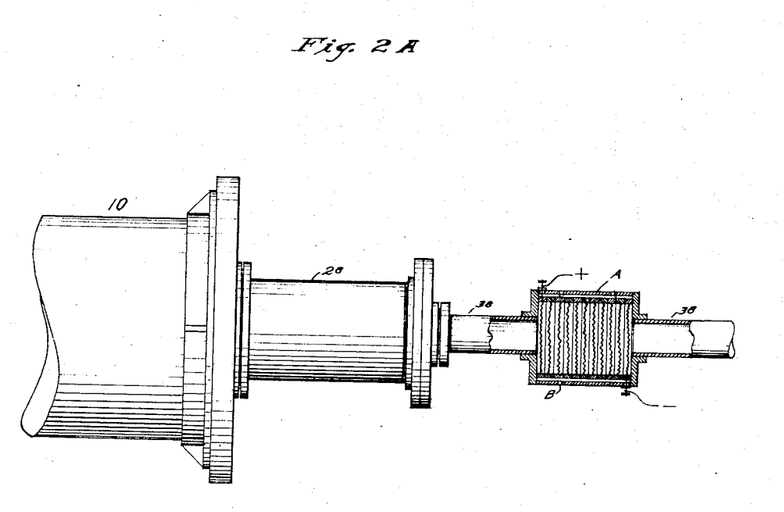

In the apparatus shown in Figures 1 and 2 use is made of a revolvable cylindrical retort 10, slightly inclined and having heads 11 and 12 resting on wheels 13 and 14 journaled in bearings 15 and 16 mounted on suitable foundations 17 and 18. At least, one of the wheels 14 is connected by a gearing 19 with a motor 20 of any approved construction to rotate the retort 10 at a comparatively slow speed, according to the nature of the material to be treated.

The material to be treated is delivered by a conveyer screw 25 into the upper end of the retort 10, and this conveyer screw is secured to a hollow shaft 26 extending centrally into the retort, and being secured to brackets 27 attached to the retort to cause the shaft 26 and the conveyer screw 25 to rotate with the retort. The conveyer screw 25 turns in a cylindrical casing 28 extending through a stuffing box 29 attached to the upper retort head 12. The material to be treated is contained in a hopper or bin 30 having an outlet 31 opening into the conveyer casing 28 and in this outlet 31 is arranged a measuring wheel 32 rotated at a predetermined speed to feed the material in predetermined quantities into the casing 28 to be carried by the conveyer screw 25 into the upper end of the retort 10. The measuring wheel 32 is mounted on a shaft 33 carrying a pulley 34 connected with other machinery for imparting the desired rotary motion to the measuring wheel 32. The hollow shaft 26 of the conveyer screw 25 forms an exhaust pipe for carrying off the volatile matter from the retort 10 and for this purpose the shaft 26 is provided with apertures 35 opening into the retort. The outer end of the hollow shaft 26 is journaled in a stuffing box 36 arranged on the head 37 closing the outer end of the conveyer casing 28. A suction pipe 38 connects with the stuffing box 36 and forms a continuation of the exhaust pipe formed by the shaft 26, and this suction pipe 38 connects with an exhaust fan 40 of any approved construction to draw the volatile matter out of the retort 10 and maintain a partial vacuum therein, it being understood that prior to starting the apparatus the air is exhausted from the retort 10. As shown in Figure 1, the discharge pipe 41 of the exhaust fan 40 connects with a settling chamber 42 to allow dust and other solid matter drawn out of the retort 10 with the volatile matter to settle in this chamber.

*Method of producing the flame.*

Inasmuch as the flame is produced by burning a combustible mixture of material including oxygen or any other supporter of combustion within an air-tight container it is necessary to feed the combustible mixture to the burner at a velocity higher than the rate of flame propagation corresponding to the mixture at the temperature prevailing within the air-tight chamber and also to take into consideration the pressure or vacuum prevailing within said chamber which will otherwise reduce or increase the volume of combustibles discharged from the burner orifice. If the velocity at the burner is too low the combustible mixture will back fire and explode; if it is too high the flame cannot be held or maintained at the burner. At the right velocity the combustible mixture will burn on the burner.

Within the lower portion of the retort 10 is arranged a burner 50 for burning a combustible mixture of fuel gas and air in a predetermined ratio thereby producing a flame projected downwardly on to the material as the latter is moved forward within the inclined retort 10 during the rotary motion thereof. The heat emanating from the flame besides heating the material causes a heating of the retort 10, which latter is preferably provided with a lining 51 of fire brick or other refractory material to readily withstand the heat. The burner 50 is mounted on the inner end of a supply pipe 52 extending through the lower end of the retort and provided at its outer portion with a valve 53 to control the amount of combustible mixture of fuel gas and air burned at the burner 50. The supply pipe 52 is connected with a mixing device 54 of any approved construction, and this mixing device 54 is connected with a gas supply pipe 55 having a valve 56 and extending into a gasometer 57 of usual construction. The mixing device 54 is used for mixing the fuel gas from the gasometer 57 with air in a predetermined ratio to produce at the burner 50 either a neutral flame, an oxidizing flame, or a reducing flame, as hereinafter more fully explained.

The mixing device 54 may be of any suitable type adapted to provide a mixture of the character required. An example of such a device is disclosed in U. S. patent of Kemp and Van Horn No. 1,420,658, dated June 27, 1922.

A neutral flame is produced within the airtight retort 10 when the amount of fuel gas and air is in the proper proportion to produce complete combustion. If an excess of air is in the mixture then an oxidizing flame is produced owing to the atmospheric oxygen content in the surplus of air not being consumed. If a less amount of air than that required for a neutral flame is mixed with the gas then a reducing flame is had, which contains an excess of hydrogen. It is understood that the mixing device 54 is adjusted to produce the desired mixture of fuel gas and air in the proper ratio for producing the desired flame above mentioned.

Neutral flame.

In case the fuel gas used for forming the combustible mixture, in connection with the proper amount of air, is produced from coal or natural gas, it contains and liberates a certain quantity of water vapors caused by the oxidiation of the hydrogen contents of the gas. These vapors are liberated as superheated steam of approximately flame temperature. It will be noticed that in view of the absence of atmospheric air within the retort 10, kept under a slight vacuum, the neutral flame fulfills two missions in that it first heats the material in the retort 10 at the desired temperature and at the same time subjects it to the influence of the superheated steam contained in the products of combustion. The other elements present in the products of combustion, like nitrogen, are, for all practical purposes, inert, it being understood that the sulphur in the original fuel gas has been removed by the usual purification methods. Thus it is evident that a neutral flame as described cannot ignite or burn even an inflammable material as no free oxygen is present which could maintain such a combustion.

Reducing flame.

The reducing flame in the retort 10 fulfills three missions: first, to heat the material in the retort to the desired temperature; second, to subject the material to the influence of superheated steam contained in the products of combustion; and, third, to subject it to the influence of free superheated hydrogen contained in the products of combustion of such a reducing flame and, under certain conditions, also to the influence of free carbon monoxide contained in the products of combustion. In regard to the possibility of free oxygen being present in the reducing flame, it may be stated that the hydrocarbons have a much greater affinity for oxygen at high temperature flames as compared with either that of hydrogen or carbon monoxide. Thus in the explosion of a mixture corresponding to $C_2H_4 + H_2 + O_2$ there is practically no formation of steam. This is especially true under the conditions under which this reducing flame burns inside of the retort, for the absence of free or atmospheric oxygen within the retort due to the action of the exhaust fan, prevents even the partial oxidation of this free hydrogen through secondary air or oxygen on the outer flame film or cone. It is expressly understood that the only oxygen admitted to the retort is that which has been premixed with the fuel gas in the form of air before it reaches the burner within the retort. In order to produce a reducing flame this admitted oxygen is insufficient for complete combustion of the hydrogen and as the retort is devoid of oxygen the hydrogen cannot possibly become oxidized. The presence of free hydrogen especially at high temperatures in such reducing flames makes it possible to obtain valuable results in the hydrogenation of certain oils, but it is of great importance particularly in the distillation and refining of crude mineral oils and asphalts in the retort as the various fractions obtained by means of the process described and those salts of phosphorus, being rich in oxygen, which are used as catalysts, are in many cases more valuable and the yield much higher than those obtained by the usual methods of distillation. Especially in the distillation of crude paraffin base oils does my method increase the yield of valuable lubricating oils at the expense of the less valuable red paraffin mass. In the distillation of asphaltum base oils increased yields of high-boiling and viscous oils are obtained at the expense of the almost valueless pitch residue ordinarily remaining in the common refinery still.

Oxidizing flame.

The oxidizing flame burning in the retort also fulfills three missions: first, to heat the material in the retort to the desired temperature; second, to subject the material to the influence of superheated steam contained in the products of combustion; and, third, to subject the material to the influence of free superheated oxygen and under certain conditions to the influence of free carbon monoxide; for instance, if a mixture of 1 part by volume of water gas (composed of equal parts by volume of hydrogen and carbon monoxide), 2.41 parts by volume of atmospheric air, and 1 part by volume of oxygen, are burned in the retort under conditions already fully described, then a quantity of oxygen equal to the 1 part of oxygen mixed with the original mixture of fuel gas and air, will be contained or mingled or mixed with the products of combustion in a free, but enormously superheated state of approximately the flame temperature, and will be available for action, in presence or in the absence of catalysts, like copper, iron, nickel, tungsten, vanadium, platinum, etc., their oxides and salts, upon the material in the retort to be subjected to such oxidizing action. On account of the ease with which oxygen at such high temperature can be applied it is now possible with my method to produce oxygen addition products from hydrocarbons, which could not be obtained heretofore except by employing pressures in autoclaves so high, that in practice they could not be used. With my method oxygen at flame temperature of any combustible gas can be obtained without pressure autoclaves. The most valuable action of the oxidizing flame if used in the presence of those salts of phosphorous rich in oxygen and stable at a high temperature like tricalcium phosphate consists in the fact that during the distillation of asphaltum or paraffin base mineral oils or coal tars or lignitic tars or shale tars, as well as certain vegetable oils, entirely different fractions and oils of an entirely different chemical composition are obtained than under the distillation of the very same materials at the very same temperatures with the above described reducing flame or with a neutral flame.

When a predetermined excess volume of hydrogen is mixed with the required mixture of fuel gas and air, then an equal quantity by weight of hydrogen will appear free, in superheated state, among the products of combustion, and will be available for hydrogenation and the formation of hydrogen addition products.

From the foregoing it will be seen that by the described process and apparatus I can obtain from the same mineral oil or tar three different series of fractions by using either a neutral flame, a reducing flame or an oxidizing flame.

The flame burning in the retort and brought in contact with the material to be treated and containing volatile matter like lignite heats up this material to the maximum flame temperature and thus separates all volatile matter contained in the material and which volatile matter together with the products of combustion is carried off through the hollow shaft 26 by the action of the exhaust fan 40, thus leaving a carbonized residue in the retort. The retort is heated by the flame and hence the material dropped by the conveyer screw 25 in the upper end of the retort is subjected to the retort heat and thus gives off its moisture which is carried off with the volatile matter through the hollow shaft 26. The speed of the retort 10 is so adjusted that the flame heats the material to over 100° C. when passing under the flame. In case lignite is treated, for instance, at about 250° C., the superheated water vapor contained in the products of combustion interacts with the volatile matter of the lignite to form Montan wax, carried through the hollow shaft 26, to be subsequently condensed as hereinafter more fully explained.

Under certain conditions after leaving the retort the pipe 38 enters a catalytic converter box A containing a number of electrically heated copper, platinum, iron, nickel, etc., wires, and which has a number of air inlets B. These air inlets B can be opened and closed by means of valves not shown on the drawing. The condensable and non-condensable gases generated in the retort enter the converter box, where they come in contact with the oxygen contained in the atmospheric air sucked in through the air inlets B in presence of the red hot catalytic agents, like iron, copper, nickel, vanadium, thorium, etc. wires and, under certain conditions become further oxidized.

The above is of great importance; for instance, when wood or saw dust is being subjected to destructive distillation within the retort, as already described, and it is desired to convert all or part of the produced wood alcohol vapors into formaldehyde. In that case the converter box A is provided with electrically heated copper wires which will bring about the interaction between the oxygen contained in the atmospheric air admitted through the air inlets B and the vapors of wood alcohol which have been created in, and exhausted from, the retort. In certain cases such as when the exhausted gases or vapors contain sufficient sensible heat to bring the catalysts to the desired temperature it will not be necessary to heat the catalysts in the converter box. They can in fact be present in the converter in form of lumps, powder, granules, asbestos sponge impregnated with a salt or oxide of these catalysts, or in any other convenient form.

There are given off in the course of the forward travel of the lignite considerable volumes of burnable, non-condensable gases, and a certain quantity of ammonia vapors, all of which are exhausted from the retort by way of the hollow shaft 26. Dust or other solid matter liable to arise during the forward movement of the material in the retort 10 is carried off with the vapors and gas to settle in the chamber 42, as previously mentioned. The quantity of yield of Montan wax is greatly improved by the use of catalysts such as salts of phosphorus which are rich in oxygen and stable at high temperatures, for instance, tricalcium phosphate. The catalysts can be mixed either with the lignite or they can be embedded in the lining 51 of the retort in the vicinity of the hottest zone. The use of the catalysts results in the production of a crude Montan wax better in purity and color than that obtained without such catalysts, and it is refined easier with a larger yield of ceresin and montanic acid.

The residue or coke, on reaching the lower end of the retort 10 is lifted by lifting arms 60 attached to the inner surface of the lining 51, and the lifted residue is finally dropped into the inner end of the conveyer casing 61 extending through a stuffing box 62 arranged on the head 11 of the retort 10. The inner end of the conveyer casing 61 is provided on top with a cut-out portion 63 to allow the lifted residue to drop into the casing to be moved along the same by a conveyer screw 64 secured to a hollow shaft 65 through which extends the supply pipe 52 of the burner 50. The inner end of the hollow shaft 65 is secured to a bracket 66 carried by the retort 10 and the other end of the said shaft is journaled in a stuffing box 67 attached to the head 68 closing the outer end of the conveyer casing 61. It will be noticed that when the retort 10 is revolving a rotary motion is given to the conveyer screw 64 to move the residue along the casing 61 into an outlet 70 extending with its lower end into water 71 contained in a tank 72. The outlet 70 is provided with a discharge wheel 73 attached to the shaft 74 carrying a pulley 75 connected with other machinery for rotating the wheel 73. It will be noticed that by the arrangement described the residue is carried off without danger of atmospheric air leaking into the retort 10.

The vapors and gases in the settling tank 42 are carried off from the top thereof by a pipe 80 extending into a closed lead-lined vessel 81 containing acidified (sulphuric acid) water supplied from a suitable source by a valved supply pipe 82. The pipe 80 extends within a short distance of the bottom of this vessel 81 and the lower end of this vessel connects with a siphon 83 for drawing off the liquid in the vessel 81 and maintaining the liquid at a predetermined level therein. The siphon 83 is provided at its discharge end with a suitable valve 84. The upper end of the vessel 81 connects by a pipe 85 with another closed vessel 86, preferably made of iron, and containing a caustic soda solution. The pipe 85 extends within a short distance of the bottom of this tank 86, as shown in Figure 1. The upper end of the vessel 86 connects by a suction pipe 90 with a suction fan 91 having its discharge pipe 92 provided with a valve 93 discharging into the gasometer 57. A pipe 94 leads from the gasometer 57 for drawing off surplus gas for other purposes. The pipe 94 is provided with a suitable valve 95. By the use of suitable chemical solutions in the vessels 81 and 86 the condensable gases are condensed, and the non-condensable fuel gas is drawn off by the suction fan 91 and discharged into the gasometer 57, thus providing a supply of fuel gas for use in the mixing device 54 to form the combustible mixture burned at the burner 50. The mixture at the burner 50 is ignited by a suitable spark plug or other means. In case of treating lignite in the apparatus, a weak sulphuric acid solution in the vessel 81 acts as a condenser for the Montan wax and absorbs the ammonia vapors present in the gases. The caustic soda solution in the vessel 86 absorbs the greater part of the carbon dioxide contained in the products of combustion incident to the burning of the flame at the burner 50 and carried along with the gases. In case analysis shows the nitrogen contents of the gas in the gasometer 57 to be too high, then the gasometer is supplied with fresh city gas, or the greater part of the gas in the gasometer 57 is allowed to escape and then the full strength gas used as it comes from the suction fan 91. In treating other materials the settling tank 42 may be dispensed with and in this case the gas is directly delivered to the vessel 81 by extending the pipe 38 into the vessel the same as the pipe 80.

Figures 3, 4:
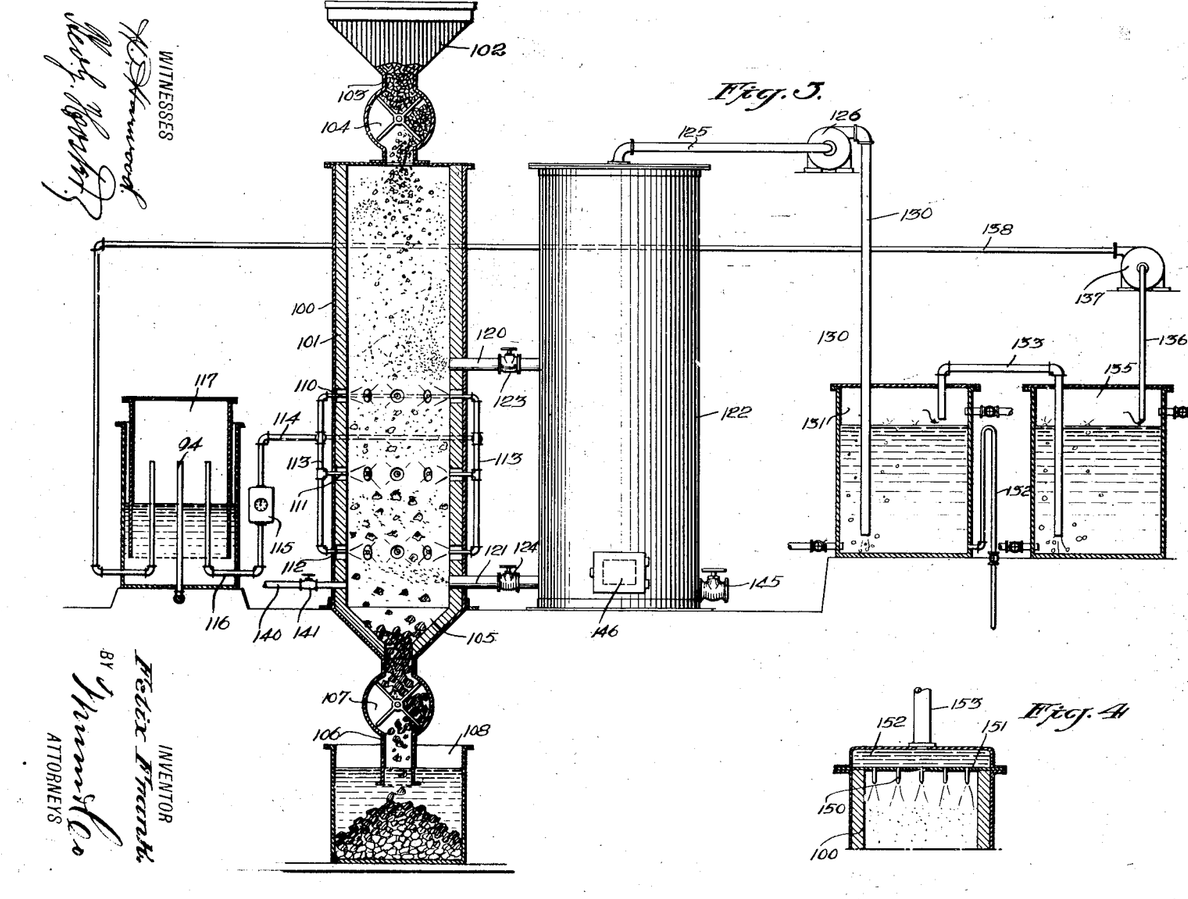
Figure 3 is a sectional side elevation of a modified form of the apparatus with parts shown in elevation and more particularly designed for treating solid materials.
Figure 4 is a sectional side elevation of a liquid feeder to be used on the upper end of the retort of the apparatus shown in Figure 3 instead of the hopper and feed wheel.
Figure 7:
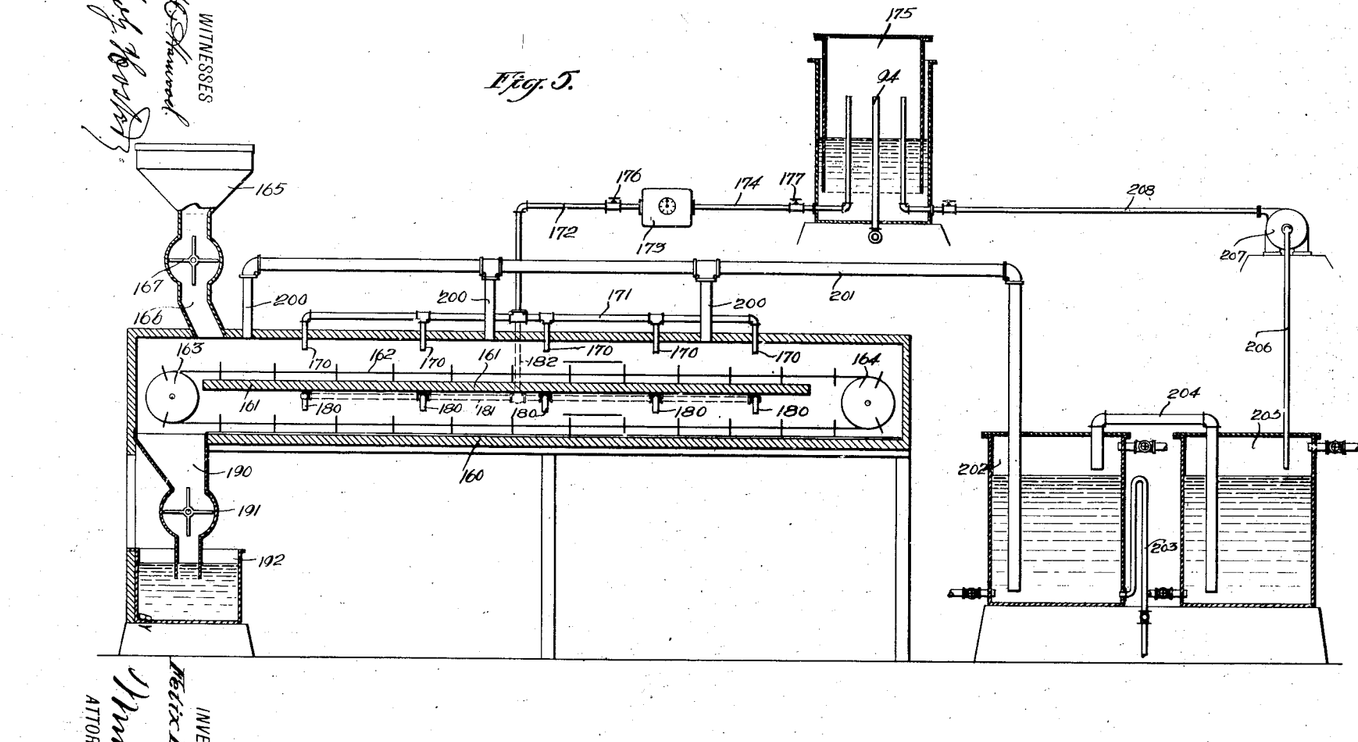

In the apparatus shown in Figure 3, use is made of a vertically disposed retort 100 provided with a lining of fire clay or other refractory material. The material to be treated is contained in a hopper 102 provided with an outlet 103 containing a measuring wheel 104 similar to the measuring wheel 32 for measuring the amount of material to be treated and delivered to the upper end of the retort 100 by the outlet 103. The lower hopper-shaped end 105 of the retort 100 is provided with an outlet 106 containing a wheel 107 and discharging into a tank 108 filled with water to immerse the lower end of the outlet 106 thus preventing atmospheric air from passing into the retort either at the inlet or at the oulet. The material in its downward travel through the retort 100 is subjected to the action of a plurality of flames emanating from sets of burners 110, 111 and 112 disposed at different levels and connected with manifolds 113 connected by a pipe 114 with a mixing device 115 connected by a pipe 116 with a gasometer 117, the same as above described in reference to the mixing device 54 and the gasometer 57. It is understood that the material is heated by the flames from the burners 110, 111 and 112 under exclusion of air to separate the volatile matter from the material and conduct the same by way of pipes 120 and 121 into a settling tank 122 together with the products of combustion arising from the burning of the combustible mixture at the burners 110, 111 and 112. The pipes 120 and 121 are provided with suitable valves 123 and 124 to regulate the withdrawal of the gases from the retort. A suction pipe 125 leads from the top of the settling tank 122 and connects with a suction fan 126 for exhausting the gases and products of combustion from the retort 100 for producing a partial vacuum therein. The outlet pipe 130 of the suction fan 126 extends into a vessel 131 similar to the vessel 81 and likewise provided with a constant level siphon 132. A pipe 133 connects the upper end of the vessel 131 with the condensing vessel 135 similar to the condensing vessel 86 and connected by a pipe with a suction fan 137 connected by its discharge pipe 138 with the gasometer 117. The action of the condensing means is the same as above described in reference to the vessels 81 and 86 so that further description of the same is not deemed necessary. The lower end of the retort 100 may be provided with a steam supply pipe 140 having a valve 141 and connected with a boiler or other steam supply for supplying the retort with steam. The tank 122 can be drained through a suitable valved outlet 145 and cleaned through a suitable manhole 146.

In case a liquid is to be treated in the retort 100 then said liquid is discharged into the upper end of the retort by nozzles or jets 150 mounted in the top 151 closing the upper end of the retort. A vessel 152 is mounted on the top 151 and is connected by a pipe 153 with a desired liquid supply. It will be noticed that the liquid to be treated passes the jets or small streams into the upper end of the retort 100 to be subjected to the action of the flames emanating from the burners 110, 111 and 112 to separate the volatile gases from the liquid and remove the same from the retort to the tank 122 to be next condensed in the vessels 131 and 135, as above explained.

The apparatus shown in Figure 5 includes a horizontally disposed retort provided with a horizontal partition 161 and with an endless conveyer 162 for drawing the material off the partition 161 and then along the bottom of the retort, the endless conveyer passing around suitable driven wheels 163 and 164 mounted in the end portions of the retort. The material to be treated is contained in a bin or hopper 165 and provided with an outlet 166 containing a measuring wheel 167 and discharging into a furnace on top of the partition 161 at the left-hand end thereof. The burners 170 are arranged in the upper portion of the retort 160 to subject the material moved along the partition 161 to the action of flames produced by the burning of a combustible mixture of fuel gas and air supplied to the burners through a pipe 171 connected by a pipe 172 with a mixing device 173 similar to the mixing device 54 previously described. The mixing device 173 receives its supply of gas through a pipe 174 from a gasometer 175. The pipes 172 and 174 are provided with suitable valves 176 and 177 to regulate the flow of the gas and the gaseous mixture. A secondary set of burners 180 is arranged within the retort 160 below the partition 161 to heat the material carried along by the endless conveyer 162 on the bottom of the retort. The burners 180 are connected with a manifold 181 connected by a pipe 182 with the pipe 172 to supply the burners 180 with the same combustible mixture of fuel gas and air that is supplied to the burners 170. The bottom of the retort 160 is provided at its left-hand end with an outlet 190 containing a wheel 191 and discharging into a tank 192 containing water, the level of which is above the lower end of the outlet 190 to prevent atmospheric air from passing into the retort at this end.

The volatile gases and products of combustion arising in the retort 160 from the heating of the material and the burning of the combustible mixture at the burners 170 and 180 is carried off through pipes 200 connected by a pipe 201 with a condensing vessel 202 similar to the condensing vessel 81 and provided with a siphon 203. A pipe 204 connects the upper end of the vessel 202 with a second condensing vessel 205 similar to the vessel 86 and connected by a pipe 206 with a suction fan 207 connected by a pipe 208 with the gasometer 175 to charge the latter with fuel gas the same as above described in reference to the gasometer 57.

*Manufacture of coal tar from bituminous coal.*

In the manufacture of coal tar from bituminous coal the same general method as that described in the manufacture of Montan wax is employed, except that the temperature may be higher, if high temperature tars are desired, or lower, if low temperature tars (Urteer or Tiefteer) are desired. Instead of Montan wax ordinary coal tar, however, is obtained in the vessel 81. The crude coal tar, however, is re-distilled in the same manner as crude mineral oils.

*Distillation and refining of distillable mineral oils including coal tars, shale and lignitic tars, asphaltum and coal tar pitch.*

When using the rotary retort 10 the hopper 30 is dispensed with and the liquid oils or tars, heated if necessary, are allowed to flow into the upper end of the retort 10 in a measured steady stream. The flame emanating from the burner 50 is so adjusted that all the desired volatile matters are given off before the residue arrives at the lifting members 60 which deliver it to the conveyer screw 64. If the residue is a liquid the lifters 60 are of spoon or bowl shape. In case there is a tendency to carbonize on the walls of the retort 10 in the hot zone a number of pebbles or iron balls are used in the retort and allowed to roll in it for the purpose of knocking off any matter that may adhere to the retort walls. As stated before, the crude tars referred to can be made to yield different fractions or distillates by using either a neutral flame, an oxidizing flame or a reducing flame in the presence of catalysts in the form of salts of phosphorus, calcium or nickel rich in oxygen or in the form of already formed residue or coke and ash. It will also be noticed that the very presence of minute quantities of such catalysts improves the color and purity of the distilled oils or waxes and increases the yield. These results are especially noticeable in the distillation of paraffin oils or paraffin base tars.

When using the stationary vertical retort 100, shown in Figure 3, for the distillation of liquid materials like the above, then the hopper 102 and the measuring wheel 104 are removed and the liquid distributing vessel 152 is used on the top of the retort. It is understood that the oils and tars in this case are sprayed into the kiln by the nebulizing and atomizing nozzles 150. The catalysts may be mixed with these oils and tars before being sprayed into the retort 100. The tiny globules forming the sprayed mist are heated to the boiling point or any other temperature as they fall downward through the flame zones. The residue or, in case of complete distillation, the carbon core drops to the bottom 105 of the retort and is discharged through the outlet 106 as above described. If it is desired to manufacture fuel gas or illuminating gas from crude oil or from fuel oil the flames are so adjusted that a temperature for complete carbonization of the oil globules is obtained and in addition to this by means of the steam pipe 140 live or superheated steam in measured volume is forced into the kiln thus interacting with the carbonized dust or globule cores according to the formula $C + H_2O = CO + H_2$.

In the manufacture of fuel gas from coal or coke whether in the rotary retort 10 or in the vertical retort 100 or in the horizontal retort 160 the live or superheated steam is introduced in the same manner as described above. The improvements described afford a means for the utilization of coke or coal dust without briquetting.

By subjecting lignite or coal to the direct action of a flame produced by burning a combustible mixture of fuel gas and air in a predetermined ratio, under exclusion of atmospheric air, within an airtight kiln or retort, from which the volatile matters are removed by means of a suction fan, I obtain coke as residue, provided that I do not heat this coke higher than that temperature at which the highest boiling fraction of the volatile matters distills over; or in other words, provided that the coke is not subjected to a flame temperature which lies materially higher than the highest boiling point of the last fraction.

In order to utilize this coke, whether in form of large lumps, breeze or dust, it is introduced in a measured, steady volume into the kiln 10, the inside of which is kept at a temperature of from 600° centrigrade to 1600° centigrade. Into this kiln is also introduced, together with the coke, a measured, steady volume of superheated steam. In order to hasten and intensify the reaction I use as catalysts either iron, copper, nickel, tungsten, vanadium, their oxides, peroxides or other salts. Between 600° and 1600° centigrade the carbon contained in the coke in the presence of catalysts will cause the hydrogen and oxygen contained in the steam to disassociate, whereupon the freed oxygen will combine with the carbon, for which it has a larger affinity, causing the formation of carbon monoxide, which together with the free hydrogen is removed from the kiln by the suction fan. $C + H_2O = CO + H_2$. The quantity of steam must be sufficient to bind all the carbon contained in the coke.

It is of course also possible to gasify all volatile matter and all fixed carbon in lignite and coke at the same time in the same operation. In that case the volume of gases will be enlarged by that portion produced through the gasification of the volatile hydro-carbons, and the resulting gas will not be simply a mixture of hydrogen and carbon monoxide, as above, but will also contain a certain percentage of methane and the like.

The introduction of steam into the kiln, in presence of the above named catalysts, is also important in the distillation of shale oil, mineral oils and wood.

In the manufacture of acetic acid, pyroligneous liquor and the like from sawdust, wood and similar material, the same general method of distillation is employed as above described for the manufacture of Montan wax except that the vessel 81 contains only water and the vessel 86 contains an oxide of lime solution.

Shales, browncoal, peat and similar materials are distilled in the same manner as described relative to the manufacture of Montan wax.

An important advantage of the process described is the ease with which heavy hydrocarbons, especially pitch residues, can be cracked with the accompanying yield of mobile, lighter oils and lubricating oils. If the same method is used on ordinary crude mineral oil as it comes from the well an increased yield of all fractions is obtained at the expense of carbon residues remaining usually in the refinery stills when the ordinary still methods are employed. The apparatus best suited for this purpose is the vertical retort 100 fitted with the spray top shown in Figure 4. If, for instance, it is desired to crack Mexican fuel oil at a temperature of 600° centigrade and 50 lbs. pressure, the mixture of gas and air which is to be burned at the burners 110, 111 and 112 must first be compressed to about 52 lbs. at which pressure it is conducted to the said burners. The Mexican fuel oil (which has been previously preheated and may be mixed with a suitable catalyst, although not always necessary) is then sprayed through the nozzles 150 into the retort under a pressure of 50 lbs. The descending oil globules are heated to the desired temperature as they pass through the flame zones and the residue, whether pitch or carbon, is drawn off to the bottom through the tight-fitting discharge wheel 107. When working with high pressures it is desirable that the discharge outlet pipe 106 terminates in the cover of a large hermetically sealed iron tank which acts as a pitch or carbon receiver. The process described can be used for all temperatures and pressures but the mixture of gas and air to be burned at the burners 110, 111 and 112 must always be under a pressure higher than that of the incoming oil or other spray. It is understood that in this case the exhaust pipes 120, 121 are provided with pressure valves (not shown) opening up only at certain definite pressures to allow of a predetermined pressure being maintained in the interior of the retort 100.

For the drying of wet organic and inorganic materials the rotary retort 10 is preferred. In this case the water vapors can be condensed or they may be blown into the air by the exhaust fan 40. The vertical retort 100 with the sprinkler or atomizer top shown in Figure 4 is recommended for use as an evaporator. In this case the solid crystals fall to the bottom after the liquid globules have been evaporated to dryness during their descent through the flame zones. As the flames do not contain any soot or other discoloring material and burn, in fact, with an almost invisible blue flame, the material cannot be discolored.

For the manufacture of carbon dioxide as a by-product from the production of burned lime or cement clinker from clay and limestone, the rotary retort 10 is preferably used. In this case enough of the gas and air mixture is burned at the burner 50 to produce a very hot torch flame the same as is ordinarily employed in cement kilns. The carbon dioxide, together with the products of combustion are removed by the exhaust fan 40 and are delivered direct to an absorption tower or compressing apparatus for liquefaction.

It should be here mentioned that the expression "under exclusion of atmospheric air" used in the specification means that an air tight retort or chamber is used in which the carbonaceous material is subjected to the flame. In other words, the carbonaceous material is subjected to the flame within a chamber or retort from which air or other substance capable of supporting combustion is excluded.

Having thus described my invention, I claim as new and desire to secure by Letters Patent:—

1. The herein described process for the treatment of heat dissociable carbonaceous material, which consists in introducing the material into an air-tight chamber, and subjecting the same to the direct action of a flame produced by burning a previously formed mixture of uniform composition containing as constituents combustible materials, and a supporter of combustion, and including an excess of one constituent, thereby heating the material to dissociate the same into volatile matter and residue and carrying out a chemical reaction by the action of an element of the excess constituent on an element of the material being treated.

2. The herein described process for the treatment of carbonaceous material which consists in introducing the material into an air-tight chamber and subjecting the same to the direct action of a flame produced by burning a previously formed mixture of uniform composition containing combustible materials, and a supporter of combustion including an excess of oxygen and thereby heating the material to decompose the same into volatile matter and residue and oxidizing either or both of them to the desired extent.

3. The herein described process for the distillation of carbonaceous material which consists in subjecting the carbonaceous material to the direct action of a flame produced by burning a previously formed mixture of combustible materials including a supporter of combustion in an air-tight retort in the presence of inorganic catalysts to heat the carbonaceous material and decompose the same into volatile matter and residue and preventing the ignition or burning of the volatile matter or the residue.

4. The herein described process for the distillation of carbonaceous material which consists in subjecting the carbonaceous material to the direct action of a flame produced by burning a previously formed combustible mixture of gases including oxygen within an air-tight retort in the presence of inorganic catalysts, and in a partial vacuum, to heat the carbonaceous material and decompose the material into volatile matter and residue and preventing the ignition or burning of the volatile matter or the residue.

5. The herein described process for the distillation of carbonaceous material such as lignite, which consists in feeding the carbonaceous material into an air-tight retort, moving the carbonaceous material along in the retort, subjecting the material to a catalytic action within the retort, subjecting the material to the direct action of a flame produced by burning a previously formed combustible mixture of gases including oxygen within the retort to heat the material and the retort, to cause the volatile matter to separate from the material through decomposition and preventing the ignition or burning of said volatile matter or residue, and then exhausting the volatile matter from the retort together with the products of combustion of the said flame.

6. The herein described process for the distillation of carbonaceous material such as lignite, which consists in feeding the carbonaceous material along in the retort, subjecting the material to the direct action of a flame produced by burning a previously formed combustible mixture of gases including oxygen within the retort to heat the material and the retort to cause the volatile matter to separate from the material through decomposition and preventing the ignition or burning of said volatile matter or residue, exhausting the volatile matter from the retort together with the products of combustion of the said flame, and maintaining a partial vacuum in the retort.

7. An apparatus for the distillation of carbonaceous materials, comprising an inclined air-tight revolvable retort, a feed-screw delivering the material to be treated to the upper end of the retort, the shaft of the feed-screw being hollow and having a perforated portion extending into the retort, an exhaust fan having a suction pipe connected with the outer end of the said hollow shaft to exhaust the gases from the retort, lifting means in the lower end of the retort, a screw conveyor at the lower end of the retort for carrying off the residue received by the said lifting means, a burner within the lower portion of the retort and having a feed pipe extending to the outside of the retort, to supply the latter with a mixture of combustible materials including a supporter of combustion.

8. The herein described process for the distillation of carbonaceous material such as lignite, which consists in feeding the carbonaceous material into an airtight retort, moving the carbonaceous material along in the retort, subjecting the material to the direct action of a flame produced by burning a previously formed combustible mixture of gases including oxygen within the retort to heat the material and the retort, to cause the volatile matter to separate from the material through decomposition and preventing the ignition or burning of the volatile matter or residue, exhausting the volatile matter from the retort together with the products of combustion of the said flame, mixing said volatile matter and the products of combustion with oxygen in the presence of inorganic catalysts, and separately removing the residue from the retort.

FELIX FRANK.